United States Patent [19]
Zoken

[11] Patent Number: 5,944,787
[45] Date of Patent: Aug. 31, 1999

[54] METHOD FOR AUTOMATICALLY FINDING POSTAL ADDRESSES FROM E-MAIL ADDRESSES

[75] Inventor: Jack M. Zoken, Sunnyvale, Calif.

[73] Assignee: Sift, Inc., Sunnyvale, Calif.

[21] Appl. No.: 08/840,574

[22] Filed: Apr. 21, 1997

[51] Int. Cl.⁶ .................................................. G06F 17/00
[52] U.S. Cl. ........................................ 709/206; 709/200
[58] Field of Search ........................... 395/200.36, 200.3, 395/200.62; 382/115; 705/26; 345/357, 329, 349; 358/402, 400, 407; 379/88.18; 709/206, 207, 208, 234

[56] References Cited

U.S. PATENT DOCUMENTS

| | | | |
|---|---|---|---|
| 5,508,817 | 4/1996 | Kunigami | 358/402 |
| 5,530,739 | 6/1996 | Okada | 379/88.18 |
| 5,613,012 | 3/1997 | Hoffman et al. | 382/115 |
| 5,799,285 | 8/1998 | Klingman | 705/26 |
| 5,801,702 | 9/1998 | Dolan | 345/357 |
| 5,805,719 | 9/1998 | Pare, Jr. | 382/115 |
| 5,805,810 | 9/1998 | Maxwell | 709/206 |

*Primary Examiner*—Ahmad F. Matar
*Assistant Examiner*—Khanh Quang Dinh
*Attorney, Agent, or Firm*—Luhen Intellectual Property Services

[57] ABSTRACT

An email mapper to identify sender's U.S. postal address by detecting in the sender's email address, email message, or the sender's posting whether the sender's name and address are identifiable in the signature line of the sender's email and searching one or more electronic white pages to identify the sender's name and postal address. Wherein if no signature line is detected in the sender's email further filtering the sender's email to identify the geographic locale of the sender and then searching against one or more electronic datases, such as a business database, an ISP database, an electronic whitepage, or email mapper's generated relational database, to identify and generate a list of one or more USPS addresses associated with the sender's email address, name and locale of the sender.

9 Claims, 5 Drawing Sheets

NNTP HOSTS aus-tx9-18.ix.netcom.com
bal-md6-11.ix.netcom.com
bos-ma7-25.ix.netcom.com
btr-la1-18.ix.netcom.com
chi-il4-24.ix.netcom.com
ftl-fl2-02.ix.netcom.com
ham-oh3-16.ix.netcom.com
hou-tx20-40.ix.netcom.com
lax-ca14-04.ix.netcom.com
lax-ca25-09.ix.netcom.com
nas-nh2-16.ix.netcom.com
netcom11.netcom.com
nyc-ny14-09.ix.netcom.com
nyc-ny41-11.ix.netcom.com
nyc-ny45-02.ix.netcom.com
orl-fl2-13.ix.netcom.com
phi-pa1-12.ix.netcom.com
phi-pa6-26.ix.netcom.com
phx-az26-16.ix.netcom.com
phx-az7-03.ix.netcom.com

HOST NAME netcom.com

*FIG. 5*

METHOD FOR AUTOMATICALLY FINDING POSTAL ADDRESSES FROM E-MAIL ADDRESSES

FIELD OF THE INVENTION

This invention relates to apparatuses and methods of identifying an individual or an entity and that individual's or entity's United States Postal Service (USPS) address given an email.

BACKGROUND OF THE INVENTION

Electronic mail is a tool for allowing people to send and receive messages from networked computers. Typically, each individual, or user, has a unique email address on a networked computer, such as an internet email address. The user's internet address commonly follows a standard format, called the Domain Name System (DNS). DNS addresses take the form of:

username@hostname.[subdomain$_{(n-1)}$. . subdomain$_{(1)}$]subdomain$_{(0)}$.domain Thus, for example, if your name is Jack Beanstalk and you work in the doughnut division of Acme Foods, Inc., then your typical email address might be of the form:

jackbeanstalk@doughnuts.acmefoods.com

The username, "jackbeanstal", is the login name assigned to the sender's user account on a particular networked computer. The hostname, "doughnuts", is the name of the computer (or cluster of computers) on which the individual's email account resides. In this case, doughnuts perhaps represents an organization in Acme Foods. The subdomain, "acmefoods", is usually the name of the company, university, or other organization. There may be more than one subdomain after the hostname, whereupon any two adjacent subdomain names are separated by a period in between. The domain name is the highest level in the Domain Name System. Acmefoods belongs to the "com" domain, along with other commercial organizations. Other top-level domains include "gov" (government institutions), "edu" (educational institutions), "org" (public and private organizations), "mil" (branches of the military), and "net" (major network support centers). There are also some country domains, such as "uk" (United Kingdom) or "oz" (Australia) for national networks outside the United States.

Given a user email address, it may be desirable to locate the individual's U.S. postal address, or in the case of a corporate entity, the corporation's U.S. postal address. A number of internet white page services provide databases of email addresses, such as Four 11 Corporation, located at 1370 Willow Road, Suite 200, Menlo Park, Calif. 94025 and PARSSEC Web Communications, 2570 West El Camino Real, Suite 309, Mountain View, Calif. 94040. Records in these databases include an email address, usually a name as well, and occasionally a USPS address. Other companies, such as ProCD, 222 Rosewood Drive, Danver, Mass 01923-4520 and American Business Information, Inc. (also known as "ABI"), 5711 South 86th Circle, Omaha, Nev. 68127, are focused on capturing the entirety of traditional paper phonebook information in electronic form. Finally, Internet services such as Dejanews, Inc., located 5407-B Clay Avenue, Austin, Tex. 78756, maintain voluminous databases of postings made to public forums on the Internet, including Usenet and publicly accessible mailing lists. These services provide a way for comprehensively searching postings to public forums including by name, organization and email address. None of these services, however, provide an automated mechanism for mapping a user's email address to and from the user's corresponding U.S. postal address. Furthermore, email addresses do not follow a uniform naming convention that would simplify identifying the user's actual name, which can then be cross-referenced to a white page database. It is thus desirable to provide a method or apparatus that would locate a user's U.S. postal address given the user's email address.

SUMMARY OF THE INVENTION

Email mapper receives an electronic mail message (email), whether including the entire email message, a USENET posting, or just the sender's email address, and in response thereto, detects whether the sender's name and address is present in the signature line of the email message and can easily be extracted directly from parsing the email or identified through searching an electronic whitepage. If not, email mapper then further filters the email to identify the geographic locale of the sender. Email mapper filters the extracted email information in both an automated method or combined with user interactive input to the email mapper, such as allowing the user to interactively explore these relationships. Once the geographic locale is isolated, email mapper then searches one or more electronic databases with the extracted geographic locale information to generate a list of possible sender's United States postal addresses. Various readily accessible electronic databases can be searched, such as an electronic whitepage, a Integrated Service Providers (ISP's) database, a business database, to thereby assemble together the fragments of the "domain to location" mapping to locate the USPS address of the sender.

DETAILED DESCRIPTION OF THE INVENTION

Figure 1:
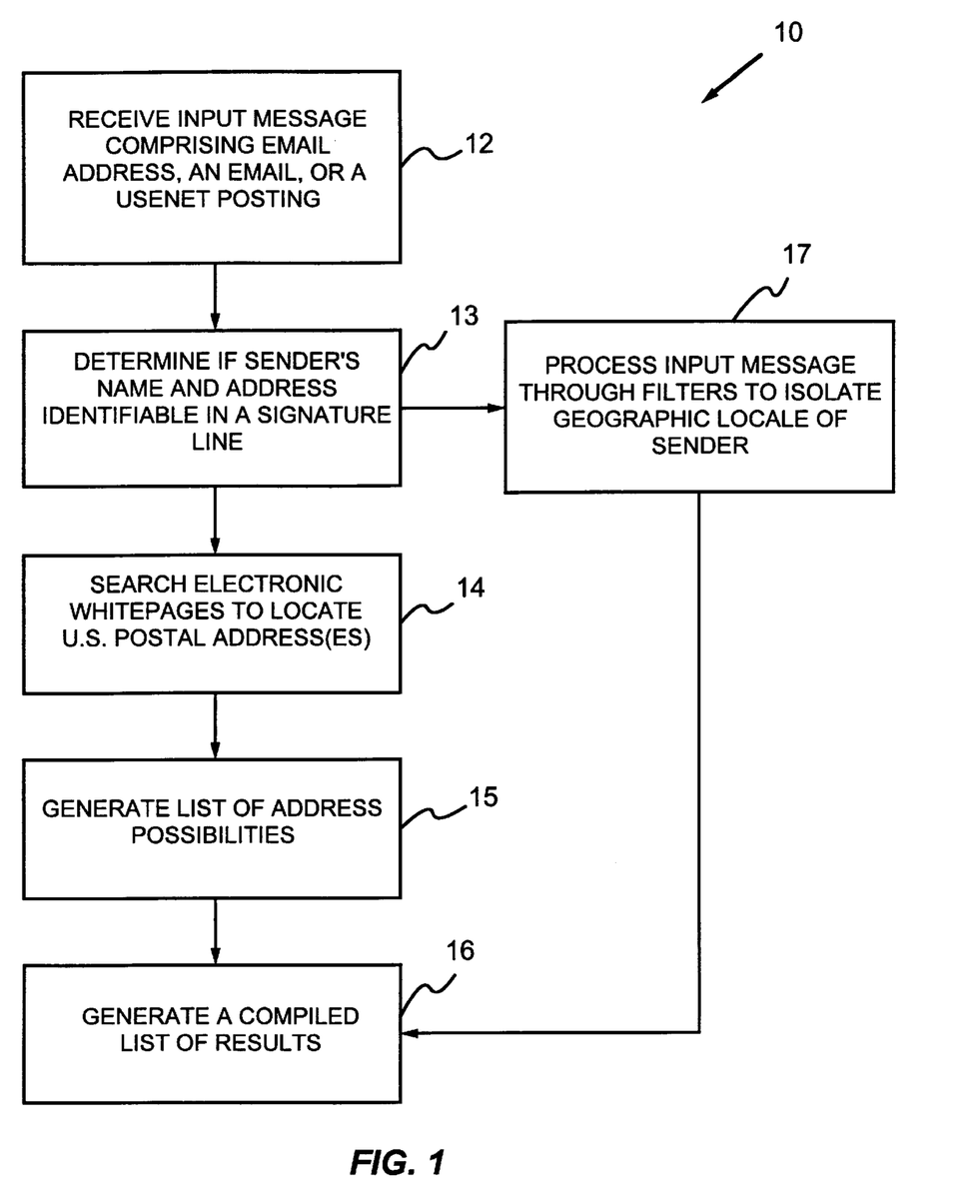
FIG. 1 is a block diagram flow chart of an email mapper described in accordance to the principles of this invention.

FIG. 1 illustrates a block diagram flow chart of the email mapper 10 described in accordance with the principles of this invention. Email mapper 10 comprises a relational database that receives in step 12 an input message comprising a sender's email address, a portion or an entire email, or a Usenet posting. Email mapper then determines in step 13 whether the sender's name and address is identifiable in a signature line of the received message. Accordingly, email mapper 10 detects whether the received input message has a signature line that is sometimes found in an email message or a posting. The following is an example of a typical email message having such a signature line:

---

Path: news.reference.com!cnn.nas.nasa.gov!ames!news.
1arc.nasa.gov!111-winken.11n1.gov!decwrl!amd!netcomsv!uu4news.
netcom.com!netcomsv!uu3news.netcom.com!ixnews.netcom.co
m!ix.netcom.com!news
From: CarlCosmo<ccosmo@aol.com>
Newsgroups: rec.woodworking -continued

```
Subject: Re: Dust Collector Outside?
Date: Sat, 27 Apr 1996 22:33:06 -0500
Organization: Netcom
Lines: 34
Message-ID: <12345678@aol.com>
References: <41tr04$s33@dpro.unicom.net>
NNTP-Posting-Host: min-mn5-14.ix.netcom.com
Mime-Version: 1.0
Content-Type: text/plain; charset=us-ascii
Content-Transfer-Encoding: 7bit
X-NETCOM-Date: Sat Apr 27 10:36:04 PM CDT 1996
X-Mailer: Mozilla 2.0 (Win95; I)
Body of Message
Signed,
Carl Cosmo / Minneapolis
```

The signature line typically contains the entire, or a portion, of the sender's name as is shown in the last line of the above email message example. If the signature line information is detected in step 13, email mapper 10 then extracts the sender's name, address and other such available information using a common parts-of-speech (POS) tagger method. If the sender's name is found, but the sender's address is not included in the email, email mapper 10 then searches one or more electronic whitepage databases in step 14 and generates a list of one or more U.S. postal addresses matching the extracted name in step 15. Email mapper 10 then in step 16 generates a compiled list of resulting lists generated from the various electronic database searches. However, if no signature line information is detected in step 13, then email mapper 10 processes the email message in step 17 through one or more filters, such as steps 20–27 (see FIG. 2), to isolate from the email message any additional information that would identify the sender's geographic locale. Once the sender's locale is isolated, then email mapper 10 generates a compiled output of resulting lists generated from the various electronic database searches of filtering step 17.

Figure 2:
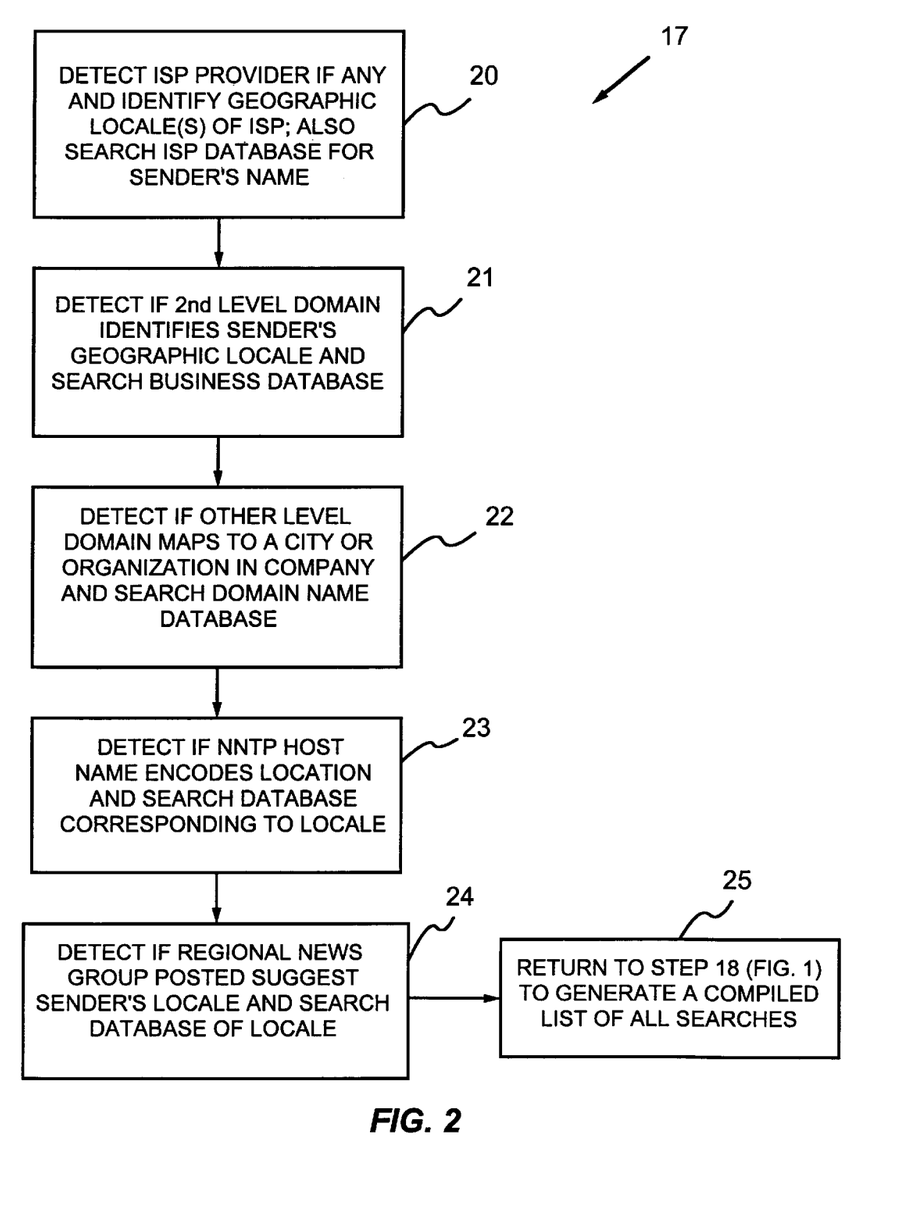
FIG. 2 is a more detailed block diagram of the filtering step of email mapper of FIG. 1.

FIG. 2 illustrates a more detailed block diagram of filter step 17 of FIG. 1 for further culling the input message to detect the geographic locale of the sender. By carefully, culling information from the input message, by allowing the user to interactively explore relationships detected between domain to location mapping, and by cross-referencing the culled or user selected information with readily accessible information, such as an ISP database, a business database, a whitepage database, and other such electronic databases the system is able to infer the geographic locale of the sender and thus the sender's likely postal address. Accordingly, in step 20, email mapper 10 detects whether a Integrated Service Provider (ISP) is indicated in the input message, then email mapper 10 searches to isolate information in that input message to identify one or more geographic locale associated with the detected ISP. ISPs are companies that provide Internet connectivity, from such nationally known companies as CompuServe Inc., 5000 Arlington Centre Blvd, Columbus, Ohio 43220 and America Online, 12100 Sunrise Valley Drive, Reston, Va. 2209, to local providers like Best Internet Communications, 345 East Middlefield Road, Mountain View, Calif. 94043, that service primarily a local geographical area. These companies provide internet accounts on their servers to users for a fee, and typically, also maintain a database comprising records of area codes of the areas they service. For example, shown below is a typical message header in a Usenet posting:

```
Newsgroup: rec.woodworking
From: jacksprout@netcom.com(Jack Sprout)
Subject: dust collector
Organization: Netcom
NNTP-Posting-Host: min-mn5-14.ix.netcom.com
```

There is of information associated with the sender in the above sample message header that can be parsed in step 20 to help identify whether there is an ISP identified in the sender's address and if the ISP can be isolated to a geographic locale. In this particular example, the ISP is Netcom.

Once an ISP is detected in the email address in step 20, a database comprising the ISP and the area codes it services is accesssed to constrain the geographic locale of the sender. The whitepage database then is searched for the geographic areas identified by the area codes to identify possible sender's postal address associated with the sender's name found in the database for those geographic locales serviced by the ISP. Alternatively, the input message header may not only identify the ISP, but also, the routing path of sender's message, thus indicating the source to destination path taken by the sender's message. This source information can then also help narrow the geographic locale of the sender and increase the accuracy of locating the probable sender's postal address.

In step 21, if an ISP is not detected, email mapper 10 then detects whether the geographic locale of the sender can be detected in the second level domain name of the sender's email address. As described previously, the typical email address follows the Domain Name System format, such as shown here:

jackbeanstalk@doughnuts.ca.acme.com

The first domain name in this example is "acmefoods", while the second domain name is "ca", and the third domain name is "doughnuts". As an example of how some corporations have used their corporate divisional information to form a portion of their employee accounts email address, this sample email address can be interpreted to reflect that Jack Beanstalk works in the doughnuts division in a California branch of Acme Foods. While no single email naming convention exists, there are encoding conventions that people commonly use in creating their email addresses that provide additional information associated with the user. Most commonly, as shown above the sender's email address incorporates some form of the sender's name. In the above example, the sender has his entire name, Jack Beanstalk, incorporated into his email address. Other common forms that users tend to use in their email address are:

First Initial Followed by Last Name
First Name
Last Name
Three Initials (First Middle Last)
First Name Followed by Last Initial Consequently, it is sometimes possible to infer the partial or full name of a person, given only their email address. Additionally, companies often establish a naming convention that mirrors the organizational hierarchy. Accordingly, a company may have multilevel deep subdomain names, with the first domain name being the name, usually the company, institutional name, to the immediate left of the ".com" and the subsequent subdomain levels numbered in increasing order to the left of the first domain name, such that the second level domain name would be to the immediate left of the first and so on. For example, a person "jbeanstalk" who works on project W in Department X in Division Y at Company Z could have the email address:

jbeanstalk@ProjectW.DeptX.DivY.Z.com.

The first level domain is therefore "Z", with "DivY" being the second level domain, "DeptX" being the third level subdomain, and the "ProjectW" being the fourth level subdomain. Companies also tend to encode either location or organizational names in their domain naming hierarchy. Thus once parsed, the email address itself can yield additional information associated with the user to help identify the sender and also to be used to isolate his U.S. postal address.

Referring back to the previous email message file example, a portion of which is shown again for convenience:

---

Newsgroup: rec.woodworking
Path: news.reference.com!uunet!in1.uu.net!chronicle.
corp.adobe.com!adobe!usenet
From: jbeanstalk@mv.us.chipcorp.com(Jack Beanstalk)
Subject: ROS FAQ, mor or less
Message-ID: <1996May2.200143.27001@adobe.com>
Organization: Chip Corp, Inc.
Distribution: na

---

This is an example of a typical USENET email message file. The Usenet is best described as the Internet electronic bulletin boards. The USENET messages have a typical format in the header lines, comprising "Newsgroup", "Message-ID" and "Path". In addition, there are the optional header lines: "Follow-up-To", "Expires", "Reply-To", "Sender", "References", "Control", "Distribution", "Keywords", "Summary", "Approved", and "Lines", "Xref. The email address, name and organization are key location marker headers, providing some geographic locale information. The subject header, message-ID, date and lines fields are not correlated with the location from which the message was posted, and for this reason they are not tracked. The "Newsgroup" field can be a location marker to the extent that it sometimes contains a regional newsgroup (e.g. ba.jobs.offered). The "Distribution" field can also be a location marker for similar reasons. The "Path" field is a less obvious marker; it represents the chain of hosts that stored and forwarded the message to the destination host. With the exception of backbone hosts, neighboring hosts in this chain are typically geographically correlated.

Figure 3:
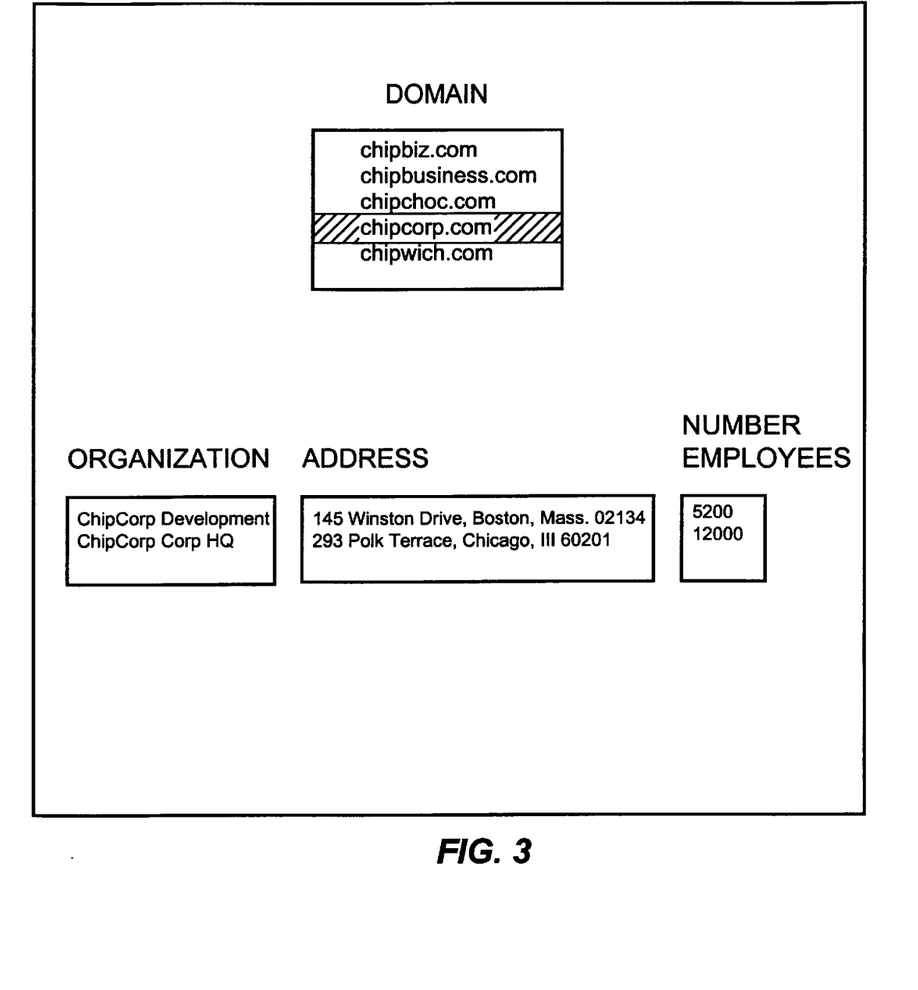
FIGS. 3–5 illustrates sample display data of filter processes described in accordance to the principles of this invention.

Thus, in step 21, email mapper 10 filters the input message, i.e., "jack@chipcorp.com" to identify the company name encoded in the domain name of the sender's email or posting. Once the company name is identified, email mapper 10 then accesses a business database comprising company names and the one or more corporate addresses associated with a particular company, such as a NIC database, to constrain the geographic locale of the sender address, such as illustrated in FIG. 3. And again, once the geographic locale of the sender is isolated from the second level of the domain name, then email mapper 10 searches the one or more electronic whitepages associated with the detected geographic locale for the sender's address.

Figure 4:
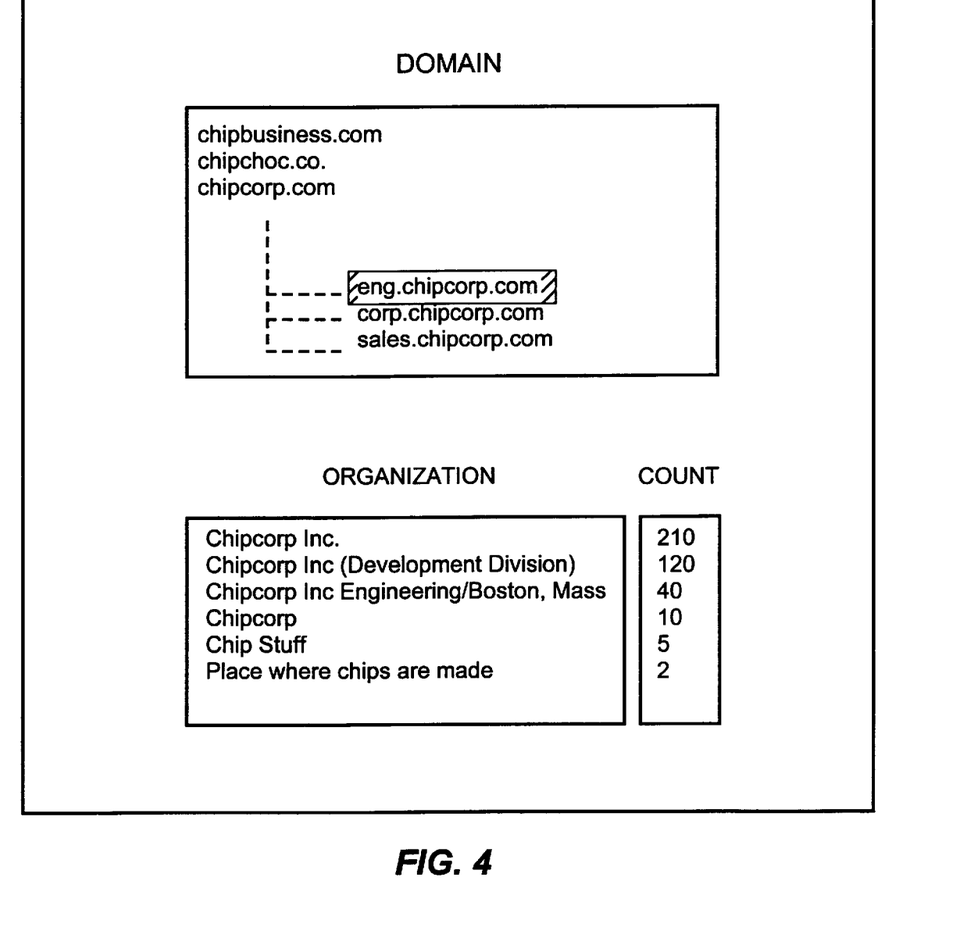

If the second level domain name indicates that the company identified in the domain name, such as "chipcorp.com", is not located in one geographic area, email mapper 10 then in step 22 determines whether the subsequent subdomain levels, i.e., third level domain name, fourth level domain name, etc., can be mapped to a city or a particular organization in a company, such as illustrated in FIG. 4. Thus in the preferred embodiment, mail mapper 10 displays the list of the various organizations or divisions found associated with a search of a particular company name in the business, and thus allows the user to visualize relationships between the company name and organizations and to select one or more most probable organizations associated with the sender. As shown in FIG. 4, an example of the relationship is shown between "eng.chipcorp.com" and the organization field. The counts are weights that describe how often a given association occurs. Counts allow the user to visually distinguish strong evidence, i.e., data, from weak evidence, and consistent evidence from contradictory evidence. For example, "eng.chipcorp.com" is either associated with the general company name, chipcorp.com, or the company development headquarters in Boston. Thus, based on a visualizer process of email mapper 10 displaying the list of organizations and count information, the user may conclude that either the business database identified the Boston subsidiary of chipcorp as the development division, or a substantial number of associations (120+40) reinforce the fact that eng.chipcorp.com is associated with development The other associations, while not supporting this assumption, do not contradict it (i.e. ChipCorp Inc. could be in Boston or in Chicago). Then once the address, and thus the geographic locale, of each of the selected corporate organizations is identified, email mapper 10 then uses that geographic locale information in searching an electronic whitepage for addresses matching the sender's name in those identified one or more geographic locales.

Alternatively, it is also envisioned that email mapper 10 can provide weightings of a sender being associated with the list of organizations associated with a particular company name. These probabilities would be based on information email mapper 10 would have accumulated from its history of processing the various previous input messages and tracking how often one message sent from a particular company was found associated with a particular division. In yet another embodiment, email mapper 10 by checking an electronic business database may detect that Adobe, for instance, is a company having a number of sites across the US but with the vast majority of its employees located at its corporate headquarters, in one city. Email mapper 10 may be programmed to encode "mv" as associated with "mv.us.adobe.com" as the location of Mountain View, Calif. This "rule" can later be modified or reprogrammed according to additional information collected later. Again, as described with step 21, once the locale is identified, email mapper 10 searches the one or more electronic whitepages associated with the detected geographic locale for the sender's address.

If, however, a city or a particular organization information is not detected in step 22, then in step 23 email mapper 10 detects whether a nntp host name encodes a location. Thus, for example email mapper 10 searches a database of ISPs under the nntp host name and identifies that "netcom" is an ISP, which provides Internet services to over 20 cities. If no information is available about whether the domain name (ix.netcom.com) is a marker for location, this information cannot be used to search the databases. However, further culling the input message, email mapper 10 detects the bottom lines in the message contain a marker called a signature for where the person lives, such as in this example, Minneapolis, Minn. This marker identifies what could be a more general marker for netcom: the NNTP posting host. The top level portion of the domain name, "min-mn5-14" appears to encode the city and state of the point of presence. At this point, email mapper 10 might generate a rule associating that NNTP posting host for Netcom likely encodes the city and state of the point of presence. Thus, if the locale information is isolated in step 23, email mapper 10 then can search the on-line database using that information to narrow down the U.S. postal address.

If no locale information is detected, then email mapper 10 in step 24 detects whether the email message was posted to a regional newsgroup which suggests the locale of the email sender. If a regional newsgroup is detected, email mapper 10 then uses that information to isolate the geographic locale of the sender's posting and search the electronic database to generate one or more U.S. postal addresses associated with the email address of the sender.

Figure 5:
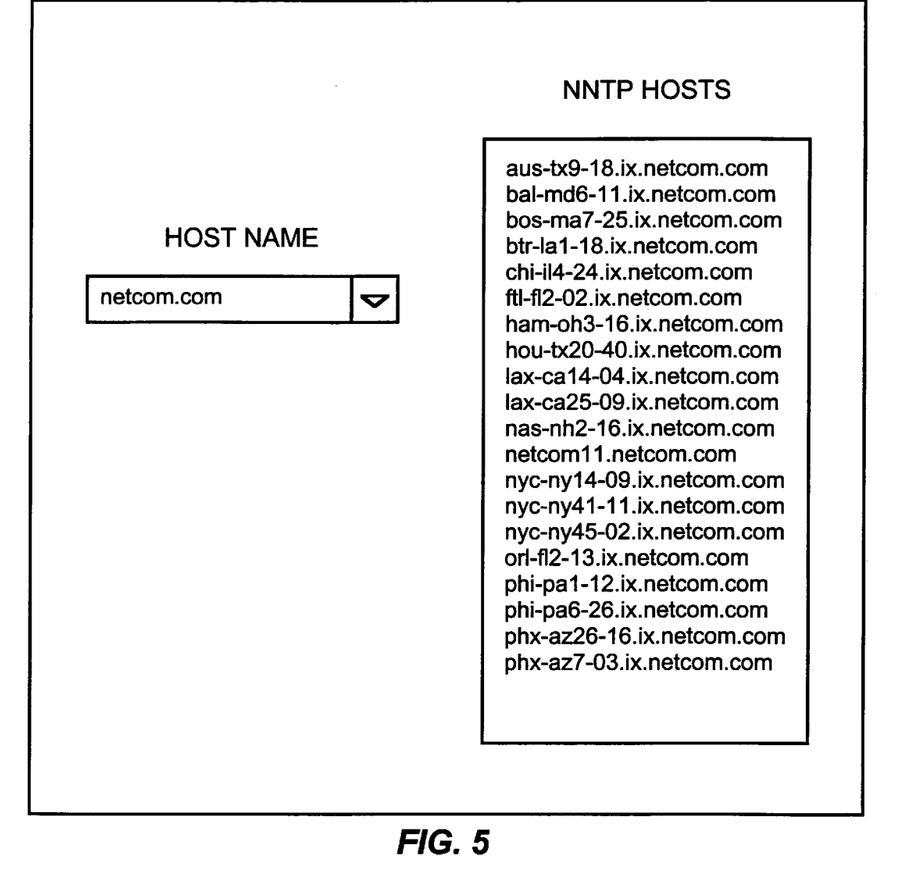

Typically, email mapper 10 relies on automated inference rule processing to the extent that this is possible. However, in the preferred embodiment, some of the rules for localizing an email address, such as steps 21–23, are preferably discovered by the user interactively visualizing relationships within the data for rule discovery and constraining the search for a matching residential address. FIGS. 3–5 illustrate a visualizer process of email mapper 10, a process that displays relationships within the data and allows the user to visualize and interactively select rules for mapping an email address. By displaying for the user the information within a business database, the user can see that ChipCorp has two major presences across the United States: Boston and Chicago. Consequently, the top level domain name by itself "chipcorp.com" might not be enough to associate an email address to a geographic locale. However, the email addresses from chipcorp.com have three levels, and the third level might suffice for disambiguation and therefore the visualizer allows the user to interactively select the rule to narrow the address search based on the information displayed. FIG. 5 thus illustrates another visualization. As mentioned earlier, it is often the case that the input message header encodes useful information about where an NNTP server is located in the prefix of the server name. Sometimes this relationship is more informative when a single ISP's NNTP server names are examined. In FIG. 5, we see that Netcom apparently encodes a city and state prefix with all their NNTP servers addresses.

If multiple possible names are found in the various searched electronic databases that matches the extracted sender's email name information, email mapper 10 may be programmed to consider a number of factors when searching for "best fit" name and residential addresses. Email mapper 10 can be programmed to narrow the choices according to a list of possible rules to apply in narrowing the choices. Thus, alternatively, after email mapper 10 completes a full pass on the email addresses in question, a portion of the email addresses/user names will be mapped to a set of possible USPS addresses with associated probabilities for each entry. For example, email mapper 10 can be programmed to consider as possible "fits":

Names (both first and last) that are more unique should result in more accurate searches.

People can go by multiple first names (usually a formal first name and a nick name)

Middle names are usually omitted, sometimes represented as middle initials and rarely represented as a full name.

Abbreviations can be used for first name and middle name.

Women are very likely to be listed under their husband's name.

People tend to live close to work.

The rules exemplified above relate to naming, with the exception of the last one: commuting distance. If we assume that how a person's name is represented in the database is independent of their commuting distance to work, then we have formed the basis for a probabilistic model that can be used to calculate the probability of a given person whose name is P and works at location L is also the person T who lives at address A.. (assume S and T are M miles apart)

$$\text{Probability } S = \frac{\text{Probability(Person } S \text{ has name } T)\text{Probability}(A \text{ and } L \text{ are } M \text{ miles apart})}{\text{SUM(Probability(Person } S \text{ has name } T')\text{Probability}(A \text{ and } L' \text{ are } M \text{ miles apart}))} \quad (1)$$

Probability S of Equation 1 is useful to identify all the possible people as identified by their USPS address, who could be the person-in question and normalize the combined probabilities.

We can measure the probability that a name S is listed as T in the phonebook. One reasonable way to do this is as follows. Consider the email addresses that are unambiguously mapped from above. Use this information to construct a probabilistic model of name mapping.

We can measure the probability that a person commutes M miles to work. This probabilistic distribution is easily constructed from available information such as US Census data.

These 2 probabilities are independently distributed random variables.

EXAMPLE

Fred Telander works at IBM in Sunnyvale. Find his USPS address.

Figure out different probabilities of different names given that the name that was seen is "Fred Telander".

| | |
|---|---|
| Fred Telander (P1) | =1/2 |
| Fred (Middle Initial) Telander (P2) | =1/4 |
| Frederick Telander (P3) | =1/8 |
| Frederick (Middle Initial) Telander (P4) | =1/16 |
| F Telander (P5) | =2/48 |
| F (Middle Initial) Telander (P6) | =1/48 |

Figure out commuting distance distribution. (Assume it is measured as exponential distribution with mean 10 miles).

Probability(between 0 and 5 miles)=⅛

Assume three names are located in white pages within 100 miles of Sunnyvale that "match" the above names.

| | | | | |
|---|---|---|---|---|
| 1. Fred Telander | 10 Chelsea Street | Sunnyvale | California | 0–5 miles |
| 2. Fred M Telander | Rowland Drive | San Jose | California | 20–25 miles |
| 3. F. Telander | 83 Chap Court | San Mateo | California | 25–30 miles |

Figure out different probabilities for commuting distances shown above.

P(commuting 0 to 5 miles) = 1/4
P(commuting 20 to 25 miles) = 1/20
P(commuting 25 to 30 miles) = 1/30
Thus, unnormalized probabilities are:
P(Fred Telander in question is Fred Telander number 1) =
P(target name is Fred Telander)*P(commute between 0 and 5 miles) =

-continued (1/2)(1/4) = (1/8)
P(Fred Telander in question is Fred M Telander number 2) = (1/80)
P(Fred Telander in question is F Telander number 3) = (2/1440)

and normalized

P(target name is Fred Telander)*P(commute between 0 and 5 miles)=0.9

P(Fred Telander in question is Fred M Telander number 2)=0.095

P(Fred Telander in question is F Telander number 3)=0.005

Finally, in step 25, the resulting lists of all database searches in filter steps 20–23 are compiled and returned. Preferably, each of the resulting list from each filter step 20–23 is assigned a particular weight depending on the strength of finding the most likely match to the sender's postal address in that filter step.

An email mapper described herein illustrates an example of the various means to implement the idea of mapping received email to derive the sender's USPS. It is contemplated that the order of the filters in step 17 may vary from the order described herein and the number of filters, such as steps 20–24 need not be the same or all implemented to practice the principles of this invention. However, it is contemplated that there are various other implementations possible without deviating from the principles of this invention.

I claim:

1. A method using a computer for mapping a sender's email address to the sender's postal address, the method comprising:

receiving a sender's email as an input to the computer; and determining whether the sender's name and address are identifiable in the input email, wherein:

if the sender's name or the sender's address are identifiable, then searching one or more electronic name and address databases to locate one or more U.S. postal addresses associated with the identified sender's name; and if the sender's name is not identifiable, then filtering the sender's email to identify the geographic locale of the sender, and then searching the one or more electronic name and address databases under the identified sender's geographic locale to generate one or more U.S. postal addresses associated with the sender's email address.

2. The method of claim 1 wherein the step of determining whether the sender's name and address are identifiable in the sender's email comprises detecting whether there is a signature line in the sender's email and parsing that signature line.

3. The method of claim 1 wherein the step of filtering the sender's email comprises detecting whether a second level domain name in the sender's email address identifies the sender's geographic locale.

4. The method of claim 1 wherein the step of filtering the sender's email comprises detecting whether one or more levels other than the second level domain name in the sender's email address identifies the sender's geographic locale.

5. The method of claim 1 wherein the step of filtering the sender's email comprises detecting whether an nntp host path encodes geographic information that identifies the sender's geographic locale.

6. The method of claim 1 wherein the step of filtering the sender's email comprises detecting whether a regional newsgroup is identified in the sender's email address indicating the geographic locale of the sender.

7. The method of claim 1 wherein the step of filtering the input email comprises detecting whether the sender's email address comprises an organization name mapping to a geographic locale of the sender.

8. A method using a computer for mapping a sender's email address to the sender's postal address, the method comprising:

receiving a sender's email as an input to the computer; and determining whether the sender's name and address are identifiable in the input email, by detecting whether there is a signature line in the sender's email and parsing that signature line, wherein if there is a signature line in the sender's email then parsing that signature line and searching one or more electronic name and address databases to locate one or more U.S. postal addresses associated with the identified sender's name; and if the sender's name is not identifiable, then filtering the sender's email to identify the geographic locale of the sender and then searching the one or more electronic name and address databases under the identified sender's geographic locale to generate one or more U.S. postal addresses associated with the sender's email address, wherein the step of filtering the sender's email comprises one or more of the following steps:

detecting whether an ISP is identified in the sender's email address;

detecting whether a second level domain name in the sender's email address identifies the sender's geographic locale;

detecting whether one or more levels other than the second level domain name in the sender's email address identifies the sender's geographic locale;

detecting whether an nntp host path encodes geographic information that identifies the sender's geographic locale;

detecting whether a regional newsgroup is identified in the sender's email address indicating the geographic locale of the sender; and detecting whether the sender's email address comprises an organization name mapping to a geographic locale of the sender.

9. A method using a computer for mapping a sender's email address to the sender's postal address, the method comprising:

receiving a sender's email as an input to the computer; and determining whether the sender's name and address are identifiable in the input email, wherein:

if the sender's name or the sender's address are identifiable, then searching one or more electronic name and address databases to locate one or more U.S. postal addresses associated with the identified sender's name;

if the sender's name is not identifiable, then filtering the sender's email to identify the geographic locale of the sender, and then searching the one or more electronic name and address databases under the identified sender's geographic locale to generate one or more U.S. postal addresses associated with the sender's email address; and wherein the step of filtering the sender's email comprises detecting whether an ISP is identified in the sender's email address.

* * * * *